US008856564B2

(12) United States Patent
Zou et al.

(10) Patent No.: US 8,856,564 B2
(45) Date of Patent: Oct. 7, 2014

(54) METHOD AND APPARATUS FOR POWER PROFILE SHAPING USING TIME-INTERLEAVED VOLTAGE MODULATION

(75) Inventors: Peng Zou, Tumwater, WA (US); Joseph T Dibene, II, Olympia, WA (US); Fenardi Thenus, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1152 days.

(21) Appl. No.: 12/641,916

(22) Filed: Dec. 18, 2009

(65) Prior Publication Data

US 2011/0154071 A1 Jun. 23, 2011

(51) Int. Cl.
*G06F 1/32* (2006.01)
(52) U.S. Cl.
CPC ..................................... *G06F 1/3203* (2013.01)
USPC ........... 713/320; 713/300; 713/310; 713/321; 713/322; 713/323; 713/324; 713/330; 713/340
(58) Field of Classification Search
USPC .................. 713/300, 310, 320–324, 330, 340
See application file for complete search history.

(56) References Cited

U.S. PATENT DOCUMENTS

| 2001/0044332 | A1 | 11/2001 | Yamada et al. | |
| 2004/0181698 | A1 | 9/2004 | Williams | |
| 2008/0022140 | A1 | 1/2008 | Yamada et al. | |
| 2008/0028246 | A1* | 1/2008 | Witham | 713/330 |
| 2008/0052551 | A1* | 2/2008 | Chapuis et al. | 713/340 |
| 2011/0004426 | A1* | 1/2011 | Wright et al. | 702/61 |

FOREIGN PATENT DOCUMENTS

| JP | 2008-026948 | 7/2008 |
| JP | 2008289302 | 11/2008 |
| WO | WO2006059698 | 6/2006 |
| WO | 2007/094935 | 8/2007 |

OTHER PUBLICATIONS

Search Report received for UK Patent Application No. 1020920.3, mailed on Mar. 15, 2011, 5 pgs.
Office Action Received for UK Patent Application No. 1020920.3, mailed on Jan. 5, 2012, 3 pgs.
Office Action Received for Japanese Patent Application No. 2010-242796, mailed on Feb. 14, 2012, 5 pgs. including 3 pgs. English translation.
Office Action Received for Korean Patent Application No. 10-2010-130176, mailed on Jul. 11, 2012, 9 pgs. including 4 pgs. English translation.
Office Action received for Japanese Patent Application No. 2010-242796, mailed Jan. 15, 2013, 4 pages including 2 pages English translation.
Office Action received for Korean Patent Application No. 10-2010-130176, mailed Jan. 30, 2013, 6 pages including 3 pages English translation.

* cited by examiner

*Primary Examiner* — M Elamin
(74) *Attorney, Agent, or Firm* — Kacvinsky Daisak Bluni PLLC (57) ABSTRACT

Embodiments of an apparatus, system and method are described for dynamically time-interleaving supply voltage modulation to shape a power profile. An apparatus may comprise, for example, a power management module to monitor power information received from a plurality of devices and send a power control signal including delay information to each device having power information that exceeds a power threshold, the delay information comprising information for time-interleaving power usage among the devices having power information that exceeds the power threshold. Other embodiments are described and claimed.

20 Claims, 7 Drawing Sheets

METHOD AND APPARATUS FOR POWER PROFILE SHAPING USING TIME-INTERLEAVED VOLTAGE MODULATION

BACKGROUND

The performance of modern computing systems has increased rapidly in recent years. One particular area in which performance has evolved is system functionality. Many modern computing systems include a plurality of devices for performing a variety of functions. The increased functionality has also resulted in increased power consumption and heat generation for computing systems that continue to decrease in size. As the functionality and multi-tasking capability of computing systems continues to increase, reductions in power consumption and heat generation become important considerations. As a result, it is desirable to adapt the peak power usage of a plurality of devices to conserve power and reduce heat generation. Consequently, there exists a substantial need for techniques to dynamically time-interleave voltage modulation for computing systems.

DETAILED DESCRIPTION

Embodiments are generally directed to techniques designed to reduce power consumption and heat generation in computing systems. Various embodiments provide techniques that include a power management module to monitor power information received from a plurality of devices and send a power control signal including delay information to each device having power information that exceeds a power threshold. In some embodiments, the delay information may comprise information for time-interleaving power usage among the devices having power information that exceeds the power threshold. Other embodiments are described and claimed.

With the progression over time toward the use of a plurality of device in mobile computing devices, power consumption and heat generation during times of simultaneous peak power consumption by a plurality of devices has steadily risen. While the inclusion of a plurality of devices in computing systems has delivered significant performance advantages, the associated power consumption and heat generation when a plurality of devices consume peak power at or near the same time causes the computing system to generate heat and to lose more power due to higher leakage current at the higher associated temperatures.

In a small-factor computing system or mobile computing device, such as Smartphone or mobile internet device for example, many devices may function simultaneously at full load to complete a given usage task within a short time period. For example, a global positioning system (GPS) transceiver may be operating to obtain location information while a wireless radio is transmitting a voice signal and a processor is executing a software thread. The platform power usage profile for a mobile computing device may include high peak power bursts due to several devices or modules functioning simultaneously at their full load. In some embodiments, the average power usage for the mobile computing device over an extended period of time may be relatively low but the high peak bursts in power usage may result in unnecessary power loss and may present challenges to cooling solution design for the mobile computing device. In some embodiments, a relatively flat power usage profile may be preferred to lower the burden on the integrated cooling solution and to reduce power loss associated with leakage.

Due to the small form factor associated with mobile computing devices, the effectiveness of integrated cooling solutions may be limited by the physical constraints of the mobile computing device. In various embodiments, an integrated cooling solution may be designed to adequately handle the high/peak usage bursts. Such a cooling solution may, however, be excessive for times of non-burst activity.

In some embodiments, reductions in the dynamic power consumption for a computing device in the range of 15%-20% may be achieved by adjusting the duty cycle of rectangular waves and voltage steps for each of a plurality of devices in the computing system. In various embodiments, use of a relatively high modulation frequency, 1 MHz for example, may also minimize any compromise in performance because the low supply voltage interval may be uniformly spread out over a full operation mode. Statistically, supply voltage modulation may save dynamic power usage while paying a minimal performance penalty. For example, dynamic power for a computing device may be calculated by the following equation:

$$P_{dynamic} = C * V^2 * f$$

where f is the clock rate.

In various embodiments, when supply voltage is modulated by a rectangular wave with duty cycle D and voltage step $\Delta V$, the resultant dynamic power may be represented by the following equation:

$$P''_{dynamic} = D * C * V^2 * f + (1-D) * C * (V - \Delta V)^2 * f$$

where $P''_{dynamic} < P_{dynamic}$.

In some embodiments, when a plurality of device are operating at their full or near peak power consumption simultaneously and are being supplied by independent rails, modulating supply voltages for each device may reduce the dynamic power usage for each device, and thereby reduce the overall dynamic power usage for the computing system. In various embodiments, however, supply voltage modulation alone may not necessarily avoid high peak power burst from occurring in the platform power profile because high supply voltage intervals of the modulated supplies may overlap. Consequently, various embodiments described herein provide an efficient means to dynamically time-interleave voltage modulation for a plurality of devices of a mobile computing device.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1A:
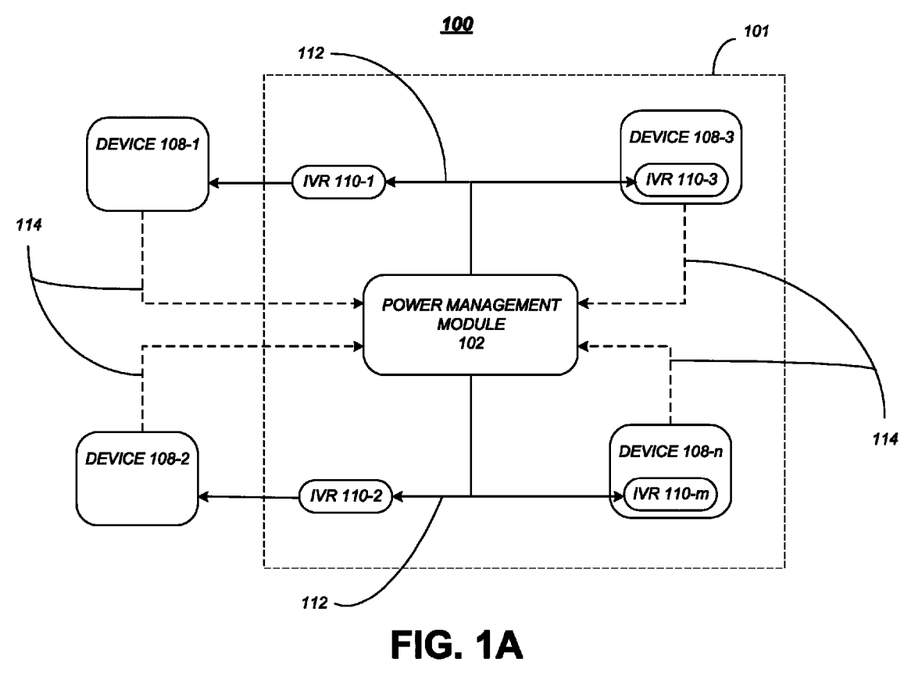
FIG. 1A illustrates one embodiment of a first apparatus.

FIG. 1A illustrates one embodiment of a first apparatus. FIG. 1A illustrates a block diagram of an apparatus 100. Apparatus 100 may comprise a computing system 100, such as a mobile computing device, in some embodiments. As shown in FIG. 1A, computing system 100 comprises multiple elements, such as die 101, power management module 102, devices 108-1-n, and integrated voltage regulators (IVR) 110-1-m. The embodiments, however, are not limited to the elements or the configuration shown in this figure.

In various embodiments, computing system 100 may include a die 101. Die 101 may comprise a block of semiconducting material on which functional circuits are fabricated. For example, die 101 may comprise an integrated circuit, microcircuit, microchip, silicon chip, chip or any other semiconductor die and still fall within the described embodiments. In some embodiments, die 100 may include the power management module 102, one or more of the plurality of devices 108-1-n; and an integrated voltage regulator 110-1-m for each of the plurality of devices. Other embodiments are described and claimed.

As shown in FIG. 1A, computing system 100 may include a plurality of devices 108-1-n. Devices 108-1-n may comprise any device or functional element of computing system 100 that requires power to perform a task. For example, devices 108-1-n may include wireless transceivers, wireless radios, GPS transceivers, processors, microcontrollers or any other type of device. While a limited number and type of devices 108-1-n are described and shown for purposes of illustration, it should be understood than any number or type of devices could be used and still fall within the described embodiments.

In some embodiments, computing system 100 may include integrated voltage regulators (IVR) and/or in-silicon voltage regulators (ISVR), 110-1-m. IVRs 110-1-m may comprise an electrical circuit designed to automatically control or maintain voltage and/or current levels. In various embodiments, IVRs 110-1-m may be implemented as part of die 101. IVRs 110-1-m may be integrated with other devices 108-1-n and/or modules of computing system 100 in some embodiments. In various embodiments, IVRs 110-1-m may be configured as part of each device 108-1-n or separate from the devices 108-1-n. In some embodiments, for devices that are off die 101, such as devices 108-1 and 108-2 in FIG. 1A, IVRs 110-1 and 110-2 may be implemented as part of die 101 and still provide power to and control devices 108-1 and 108-2. Other embodiments are described and claimed.

In various embodiments, the IVRs 110-1-m of computing system 100 may allow for actively shaping of the power usage profile of computing system 100 by time-interleaving peak power usage of device 108-1-n. For example, IVRs 110-1-m may enable supply voltages to be modulated between high and low settings in a near real-time fashion. In some embodiments, IVRs 110-1-m may also provide fine granularity to enable independent supply for each individual device 108-1-n. Time-interleaving power usage peaks for devices 108-1-n may be realized by time-interleaving supply voltage modulation, and my result in reduced power consumption and heat generation for computing system 100 in some embodiments.

In various embodiments, power management module 102 may comprise a software driver or application to mange IVRs 110-1-m and to manage power and heat generation for computing system 100. In some embodiments, power management module 102 may comprise a software driver, application, algorithm or other module to control entry into and management of a specific power plan, such as a plan that controls time-interleaving and power modulation for a plurality of system devices 108-1-n and IVRs 110-1-m. In various embodiments, any module described herein may comprise software, hardware or a combination of hardware and software. In some embodiments, modules may comprise circuits or other logic. The power plan may comprise a configurable plan that reduces device power consumption during times of high burst activity, such as times when a plurality of devices are operating at or near peak power consumption at the same time. It should be understood that while power management module 102 is shown as an independent component in computing system 100, it may be included in memory to be executed by a processor, as part of an operating system (OS) or in any other location or configuration within computing system 100 and still fall within the described embodiments. Other embodiments are described and claimed.

In some embodiments, power management module 102 may be operative to monitor power information received from a plurality of devices, such as device 108-1-n for example. As illustrated by lines 114 in FIG. 1A, power management module 102 may receive power information from each device 108-1-n. In various embodiments, the power information may comprise power consumption for each device 108-1-n that is continuously sent from each device 108-1-n to power management module 102 in real-time or substantially real-time.

Upon receipt of the power information, power management module 102 may be configured to compare the power information from each device 108-1-n to a power threshold. The power threshold may comprise a threshold power for the computing system 100, for each device 108-1-n, or for each individual device 108-1-n. In various embodiments, power management module 102 may send a power control signal including delay information to each device 108-1-n and/or each IVR 110-1-m having power information that exceeds the power threshold. The power control signal is illustrated by lines 112 in FIG. 1A for example. In some embodiments, the delay information may comprise information used to time-interleave power usage among the devices 108-1-n having power information that exceeds the power threshold. Other embodiments are described and claimed.

In various embodiments, each device 108-1-n may include or be associated with an integrated voltage regulator (IVR) 110-1-m to monitor the power usage and control the time-interleaving for the device. In some embodiments, each device 108-1-n may be supplied by a dedicated power rail from IVRs 110-1-m respectively. IVRs 110-1-m may be configured to quickly adjust power rail voltages for devices 108-1-n in some embodiments. For example, a 100 mV voltage step in 10 ns may be obtained. In various embodiments, supply voltages for devices 108-1-n may be modulated with rectangular waves at various frequencies up to several megahertz (MHz) and the modulation frequency may be chosen based on prior knowledge of a specification of a device 108-1-n to minimize performance impact due to supply fluctuation.

Figure 1B:
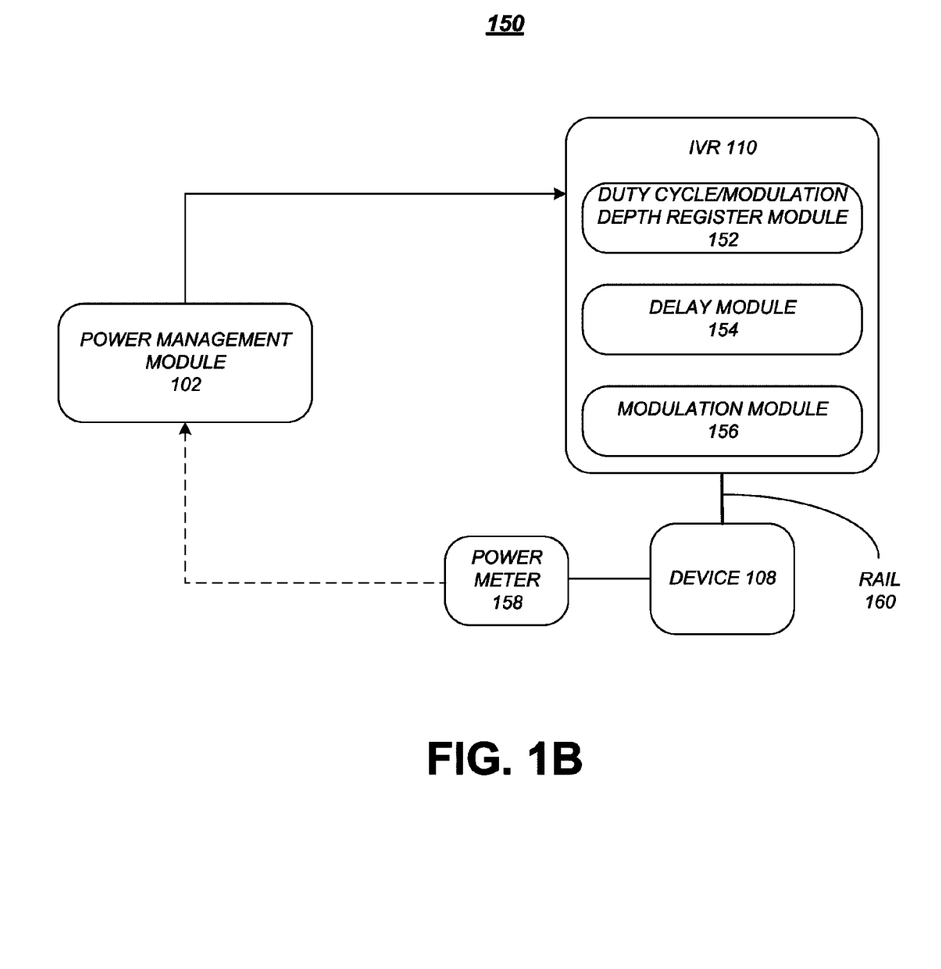
FIG. 1B illustrates one embodiment of a second apparatus.

FIG. 1B illustrates one embodiments of a second apparatus. FIG. 1B illustrates a block diagram of an apparatus 150. Apparatus 150 may comprise a portion of computing system 100 of FIG. 1A, for example. As shown in FIG. 1B, computing system 150 comprises multiple elements, such as power management module 102, device 108, power meter 158, rail 160 and IVR 110 comprising a duty cycle/modulation depth register module 152, a delay module 154 and a modulation module 156. In various embodiments, power management module 102, device 108 and IVR 110 may be the same or similar to the corresponding components illustrated and described in FIG. 1A. The embodiments, however, are not limited to the elements or the configuration shown in this figure.

In various embodiments, power meter 158 may comprise an embedded real-time power meter configured to measure energy consumption during a short, programmable time interval for device 108. As shown in FIG. 1B, power meter 158 may send the measured power information or power consumption to power management module 102. While shown as a separate element, it should be understood that power meter 158 may be part of device 108 or IVR 110 and still fall within the described embodiments. In some embodiments, power meter 158 may be part of die 101, for example.

IVR 110 may comprise a duty cycle/modulation depth register module 152, a delay module 154 and a modulation module 156 in some embodiments. In various embodiments, the duty cycle and modulation depth register module 152 may be programmed to set nominal supply voltages, the duty cycle of high supply voltages of a modulated voltage wave, and voltage steps between high and low supply voltages. Delay module 154 may comprise a digital delay unit to delay a given modulated supply voltage wave in some embodiments. In various embodiments, modulation module 156 may comprise digital control logic to control IVR 110 transitions between high and low voltage settings, and also to control delays of transition and high and low voltage durations. Other embodiments are described and claimed.

Figure 2A:
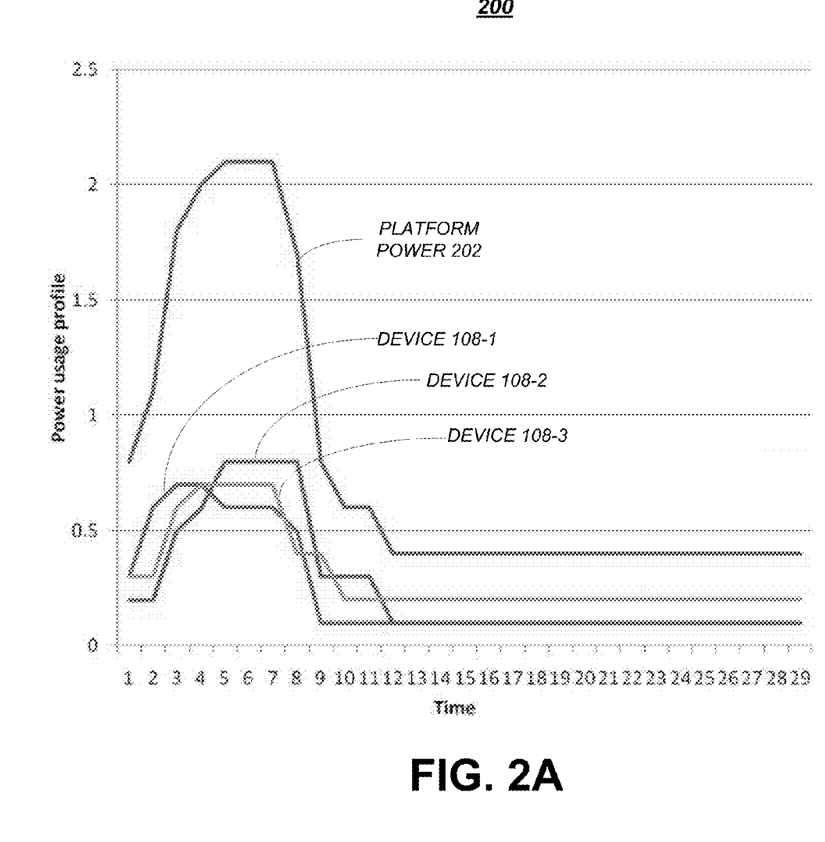
FIG. 2A illustrates one embodiment of a first chart.
Figure 2B:
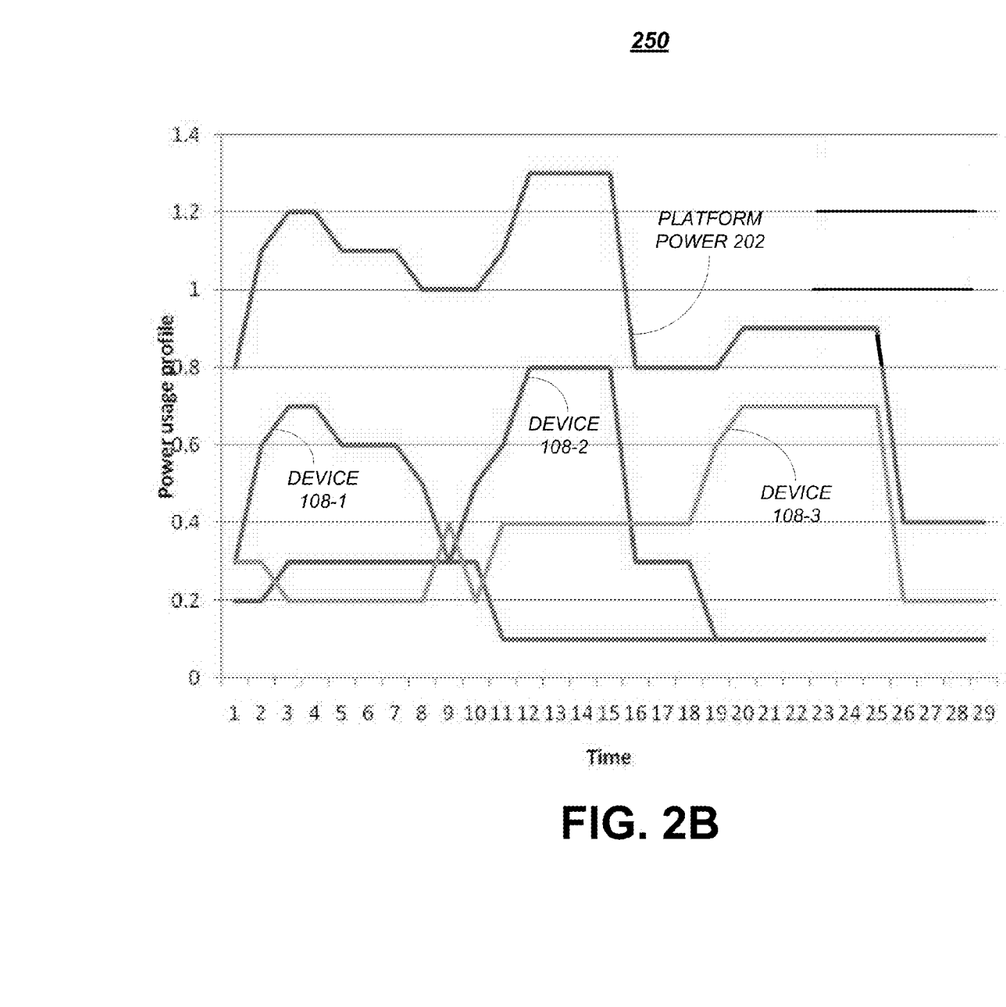
FIG. 2B illustrates one embodiment of a second chart.

FIGS. 2A and 2B illustrate embodiments of charts 200 and 250 showing power usage profiles versus time. Chart 200 of FIG. 2A illustrates power usage profiles for devices 108-1, 108-2 and 108-3 and also platform power 202 illustrating total platform power consumption for a computing system containing devices 108-1, 108-2 and 108-3, for example. FIG. 2A illustrates a scenario where high burst activity occurs for a plurality of devices and time-interleaving of the voltage modulation, as described above, is not utilized. In various embodiments, devices 108-1, 108-2 and 108-3 may have high peak power at or near the same time, in which case the platform power 202 may also have high peak power usage over a short period, which may be undesirable and may result in increased heat generation and power consumption.

By way of contrast, chart 250 of FIG. 2B illustrates power usage profiles for devices 108-1, 108-2 and 108-3 and also platform power 202 illustrating total platform power consumption for a computing system containing devices 108-1, 108-2 and 108-3 where, in some embodiments, time-interleaving of the voltage modulated supplies for devices 108-1, 108-2 and 108-3 is implemented as described above with reference to FIGS. 1A and 1B. As illustrated in FIG. 2B, the peak platform power 202 may be significantly lower than the peak platform power in FIG. 2A. In some embodiments, this reduction in peak platform power may result from spreading out the peak power usage of devices 108-1, 108-2 and 108-3 at different times, resulting in an overall power usage profile having a relatively flat envelop. Other embodiments are described and claimed.

Figure 3A:
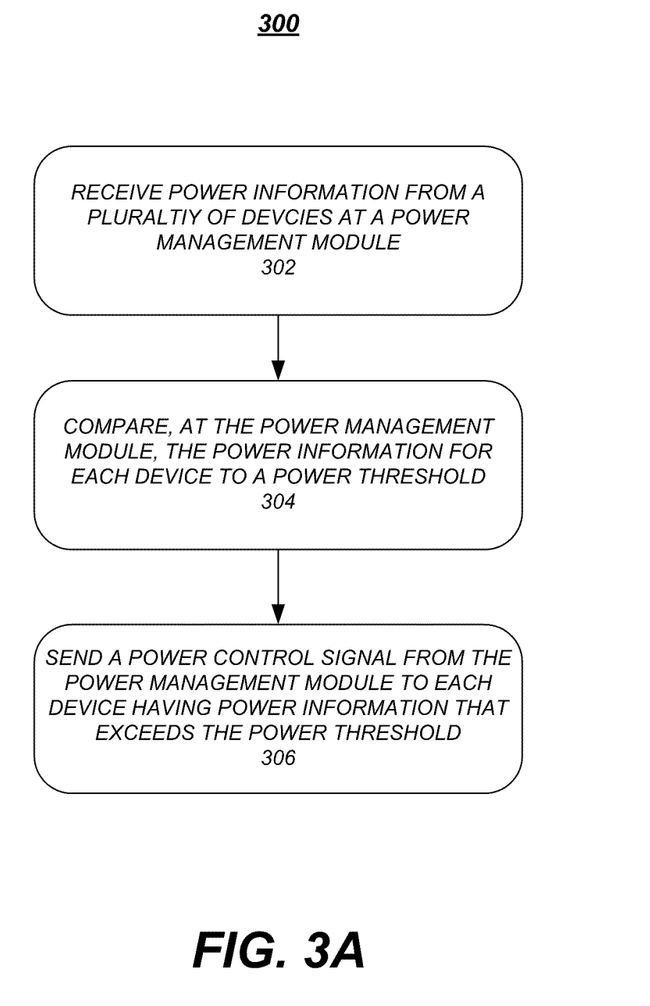
FIG. 3A illustrates one embodiment of a first logic diagram.

FIG. 3 illustrates one embodiment of a logic flow 300. The logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming or computer-readable instructions to be executed by a logic device (e.g., computer, processor). Logic flow 300 may describe the time-interleaving of supply voltage modulation signals described above with reference to apparatus 100 and apparatus 150 and power management module 102.

In various embodiments, power information may be received from a plurality of devices at a power management module at 302. For example, power management module 102 of FIG. 1A may receive power information from each active device 108-1-$n$. At 304, in some embodiments, the received power information may be compared to a power threshold at the power management module. For example, power management module 102 may compare power information for each device 108-1-$n$ to a power threshold known to the power management module 102. In some embodiments, the power threshold may be a predetermined threshold or it may be a dynamic threshold that changes based on the number of active devices 108-1-$n$ or based on any other suitable factor.

A power control signal may be sent from the power management module to each device having power information that exceeds a power threshold at 304 in some embodiments. For example, power management module 102 may send a power control signal including delay information to each device 108-1-$n$ having power information that exceeds the power threshold. In various embodiments, the delay information may comprise information for time-interleaving power usage and/or voltage modulated power signals among the devices having power information that exceeds the power threshold. Other embodiments are described and claimed.

In some embodiments, the power control signal is sent only to each device having power information that exceeds the power threshold when a plurality of devices have power information that exceeds the power threshold. For example, where only one device has power information that exceeds the power threshold, it may not be necessary to time-interleave the voltage modulated power signals of devices 108-1-$n$. In embodiments where multiple devices have power information that exceeds the threshold, however, it may be necessary to time-interleave the voltage modulated power signals to prevent a plurality of devices from having peak power consumption occurring at or near the same time.

In various embodiments, each device may include an integrated voltage regulator (IVR) to detect power information and to time-interleave power usage using the delay information. For example, each device 108-1-$n$ may include or be associated with an IVR 110-1-$m$ which controls the power supplied to the device 108-1-$n$ based on information received from the power management module 102. In some embodiments, each IVR 110-1-$m$ communicates with a corresponding device 108-1-$n$ by way of a dedicated power rail, such as rail 160 of FIG. 1B.

A nominal supply voltage, duty cycle and voltage step may be set for each device in some embodiments. For example, IVRs 110-1-$m$ may include a duty cycle/modulation depth register module 152 to control and/or set nominal supply voltages, duty cycles and voltage steps for each device 108-1-$n$ based on the power control signal received from power management module 102. In various embodiments, a modulated supply voltage signal may be delayed for each device. For example, a delay module 154 of IVR 110 may be operative to delay a modulated supply voltage signal intended for device 108 in order to coordinate time-interleaving of the modulated supply voltage signals of a plurality of devices. In some embodiments, the transitions and delay between high and low voltage settings may be controlled for each device. For example, a modulation module 156 of IVR 110 may be operative to further process the modulated voltage signal intended for device 108. Other embodiments are described and claimed.

Figure 3B:
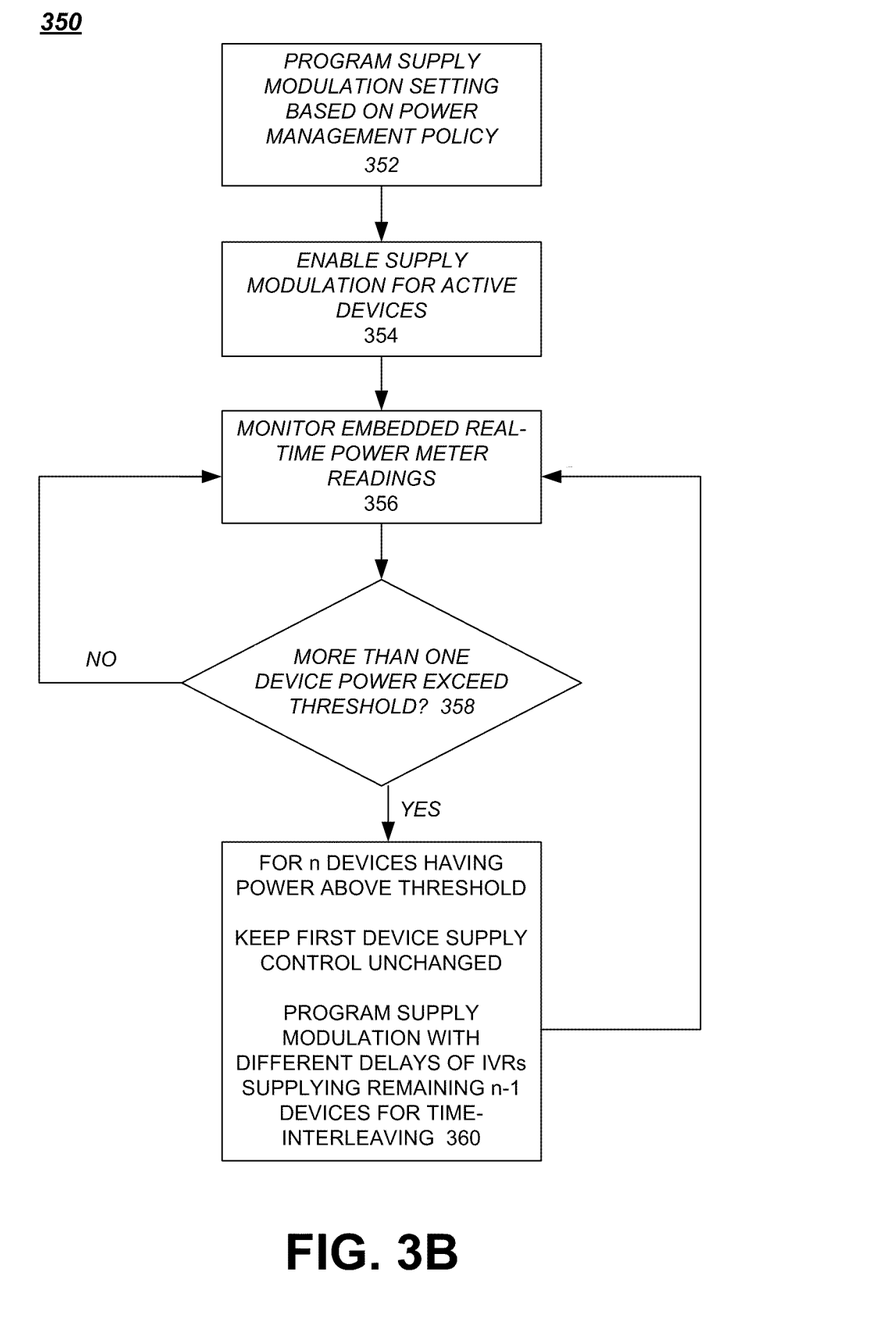
FIG. 3B illustrates one embodiment of a second logic diagram.

FIG. 3B illustrates one embodiment of a second logic flow 350. As described above with reference to logic flow 300, the logic flow 350 may be performed by various systems and/or devices and may be implemented as hardware, software, firmware, and/or any combination thereof, as desired for a given set of design parameters or performance constraints. For example, one or more operations of the logic flow 350 may be implemented by executable programming or computer-readable instructions to be executed by a logic device (e.g., computer, processor). Other embodiments are described and claimed.

In various embodiments, an agent, such as power management module 102, may be configured to intelligently program delays of all modulated supplies for a plurality of devices to ensure that the modulated supplies are time-interleaved to avoid simultaneous peak power consumption. This may done, for example, based on a selected power management policy at 352. At 354, supply modulation may be enabled for active devices. For example, for each device 108-1-n that is consuming power in computing system 100, supply modulation may be enabled to help prevent simultaneous peak power consumption.

The agent or power management module 102 may be configured to continuously monitor embedded real-time power meter readings from all devices in the platform 356 in some embodiments. For example, power meter 158 of FIG. 1B may continuously provide power information, including power consumption for one or more devices, to power management module 102. If, at 358, the power usage of more than one device does not exceed the threshold, the system returns to continuous monitoring. In various embodiments, at 358, if the power usage of more than one device exceeds a pre-set or know power threshold, the agent or power management module will program a delay control of a corresponding IVRs to create time-interleaving among supply modulation waveforms. In some embodiments, this may include keeping the supply signal for a first device unchanged and programming the remaining modulated supplies with different delays to enable time-interleaving of the modulated voltage supplies.

In various embodiments, after enabling the different delays, the logic flow 350 may return to monitoring real-time power readings. By continuously executing this algorithm, power management module 102 that comprises or includes a power profile shaping agent may be operative to spread out high power usage peaks to different timeframes, as illustrated by chart 250 of FIG. 2B. Other embodiments are described and claimed.

Figure 4:
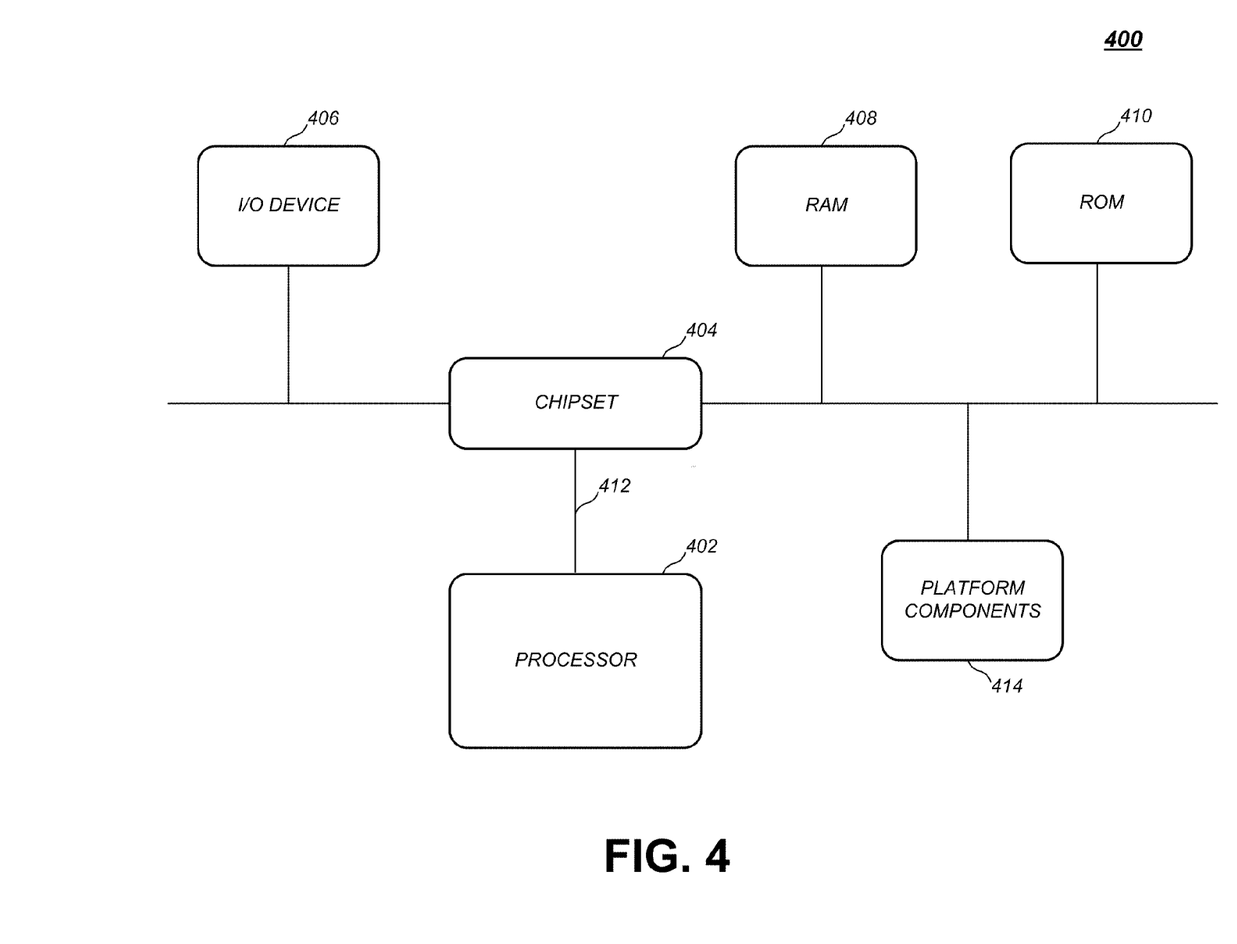
FIG. 4 illustrates one embodiment of a system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, and ROM 410 are coupled to processor 402 by way of chipset 404. Chipset 404 may be coupled to processor 402 by a bus 412. Accordingly, bus 412 may include multiple lines. In various embodiments, chipset 404 may be interested or packaged with processor 402. Other embodiments are described and claimed.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   a processor arranged on a die; and
   a power management module operative on the processor to monitor power information received from a plurality of devices and send a power control signal including delay information to each device having power information that exceeds a power threshold, each of the plurality of devices including a dedicated power rail to couple the device to a dedicated integrated voltage regulator (IVR) arranged on the die, each IVR operative to time-interleave power usage based on the delay information if the device associated with the IVR has power information that exceeds the power threshold, the power information comprising device power consumption continuously received from each of the plurality of devices in real time or substantially in real time from an on die power meter.

2. The apparatus of claim 1, the delay information comprising information for time-interleaving power usage among two or more of the devices.

3. The apparatus of claim 1, one or more of the devices including a duty cycle and modulation depth register module operative to set a nominal supply voltage, duty cycle and voltage increment.

4. The apparatus of claim 1, one or more of the devices including a delay module operative to delay a modulated supply voltage signal.

5. The apparatus of claim 1, one or more of the devices including a modulation module operative to control and delay transitions between high and low voltage settings.

6. A computer-implemented method, comprising:
   continuously receiving power information in real time or substantially in real time from each of a plurality of devices at a power management module operative on a processor arranged on a die; and
   sending a power control signal from the power management module to each device having power information that exceeds a power threshold, the power control signal including delay information and each of the plurality of devices including a dedicated power rail to couple the devices to a dedicated integrated voltage regulator (IVR) arranged on the die, each IVR operative to time-interleave power usage based on the delay information if the device associated with the IVR has power information that exceeds the power threshold.

7. The method of claim 6, the delay information comprising information for time-interleaving power usage among two or more devices having power information that exceeds the power threshold.

8. The method of claim 6, comprising:
sending the power control signal to two or more devices having power information that exceeds the power threshold when a plurality of devices have power information that exceeds the power threshold.

9. The method of claim 6, comprising:
setting a nominal supply voltage, duty cycle and voltage increment for one or more devices.

10. The method of claim 6, comprising:
delaying a modulated supply voltage signal for one or more devices.

11. The method of claim 6, comprising
controlling transitions and delay between high and low voltage settings for one or more devices.

12. An article comprising anon-transitory computer-readable storage medium containing instructions that if executed by a processor enable a system to:
continuously receive power information in real time or substantially in real time from each of a plurality of devices at a power management module; and
send a power control signal from the power management module to each device having power information that exceeds a power threshold, the power control signal including delay information and each of the plurality of devices including a dedicated power rail to couple the devices to a dedicated integrated voltage regulator (IVR), each IVR operative to time-interleave power usage based on the delay information if the device associated with the IVR has power information that exceeds the power threshold.

13. The article of claim 12, the delay information comprising information for time-interleaving power usage among two or more devices having power information that exceeds the power threshold.

14. The article of claim 12, comprising instructions that if executed enable the system to send the power control signal to two or more devices having power information that exceeds the power threshold when a plurality of devices have power information that exceeds the power threshold.

15. The article of claim 12, comprising instructions that if executed enable the system to:
set a nominal supply voltage, duty cycle and voltage increment;
delay a modulated supply voltage signal; and
control transitions and delay between high and low voltage settings.

16. A system, comprising:
a processor arranged on a die;
a display; and
a power management module operative on the processor circuit to monitor power information received from a plurality of devices and send a power control signal including delay information to each device having power information that exceeds a power threshold, each of the plurality of devices including a dedicated power rail to couple the device to a dedicated integrated voltage regulator (IVR) arranged on the die, each IVR operative to time-interleave power usage based on the delay information if the device associated with the IVR has power information that exceeds the power threshold, the power information comprising device power consumption continuously received from each of the plurality of devices in real time or substantially in real time from an on die power meter.

17. The system of claim 16, the delay information comprising information for time-interleaving power usage among two or more devices having power information that exceeds the power threshold.

18. The system of claim 16, one or more of the devices including a duty cycle and modulation depth register module operative to set a nominal supply voltage, duty cycle and voltage increment for the device.

19. The system of claim 16, one or more of the devices including a delay module operative to delay a modulated supply voltage signal for the device.

20. The system of claim 16, one or more of the devices including a modulation module operative to control and delay transitions between high and low voltage settings for the device.

\* \* \* \* \*